United States Patent [19]

Mizuno

[11] Patent Number: 5,270,862
[45] Date of Patent: Dec. 14, 1993

[54] GUIDE APPARATUS FOR VERTICAL MOVEMENT OF A STAGE

[75] Inventor: Jiro Mizuno, Fujisawa, Japan
[73] Assignee: Nikon Corporation, Tokyo, Japan
[21] Appl. No.: 943,707
[22] Filed: Sep. 11, 1992
[30] Foreign Application Priority Data
  Sep. 18, 1991 [JP] Japan .................................. 3-238292
[51] Int. Cl.⁵ ........................ G02B 21/26; G02B 21/08
[52] U.S. Cl. ..................................... 359/392; 359/385
[58] Field of Search ............... 359/392, 391, 390, 388, 359/385

[56] References Cited
FOREIGN PATENT DOCUMENTS
  973656  3/1960  Fed. Rep. of Germany ...... 359/392
  3-58011 3/1991  Japan .

*Primary Examiner*—Jon W. Henry
*Attorney, Agent, or Firm*—Shapiro and Shapiro

[57] ABSTRACT

A guide apparatus for vertical movement of a stage supports a stage supporting member for supporting the stage vertically movable by means of two groups of guide mechanism. Each of the guide mechanism groups is separately mountable with respect to the stage supporting member and is fixed to sandwich the stage supporting member from the left and right side. For one of the guide mechanisms, a highly rigid guide member machined with a high precision is used while a for the other guide mechanism, a guide member having a low rigidity as compared with the foregoing highly rigid guide member is used. One of the guide mechanisms is arranged so that its mounting position can be adjusted to match with the other guide mechanism. The mounting position of one of the guide mechanism is made higher than that of the other guide mechanism. The light path of the beam from a light source is provided lower than the mounting position of the foregoing one of the guide mechanisms.

14 Claims, 6 Drawing Sheets

GUIDE APPARATUS FOR VERTICAL MOVEMENT OF A STAGE

BACKGROUND OF THE INVENTION

1. Field of the Invention

The present invention relates to a guide apparatus for vertical movement of a stage. More particularly, the invention relates to the apparatus suitable for vertically guiding the stage of a microscope whereby to enable the observation of sizable specimens, a liquid crystal display panel and others, for example.

2. Related Background Art

A guide apparatus for vertical movement of a stage used for a microscope is to support the stage vertically movable on which to place a specimen. Traditionally, a vertical movement guiding apparatus of the kind used for a microscope supports its stage in a cantilever fashion to make it movable vertically for the observation of a small specimen such as slide glass using two sets of guide members each comprising a movable portion and a base portion which make a pair having rollers or balls therebetween.

Now, in recent years, the sizes of the specimens to be examined have become larger, such as a wafer and liquid crystal glass substrate. Along with this, there is a tendency that the stage is made larger. Also, at the same time, the contents of the specimen to be examined have become more minute, necessitating precise observations and precise measurements using a microscope or other optical equipment. However, the foregoing apparatus for vertically guiding a stage is supported in a cantilever fashion. As a result, there is a disadvantage that the stage is inclined or bent when it is made larger. Because of this, any precise observations and precise measurements cannot be conducted. Thus, there is a need for a guide apparatus for vertical movement of a stage having a rigidity strong enough to prevent the stage from being inclined, at the same time, being capable of supporting the stage movable in the vertical direction. For example, it is conceivable to provide a guide apparatus for vertical movement of a stage as shown in FIG. 5 to FIG. 7. Now, hereinafter, the description will be made of this guide apparatus for vertical movement of a stage. In this respect, this guide apparatus for vertical movement of a stage is disclosed in Japanese Patent Application Laid-open No. 3-58011.

As shown in FIG. 5 and FIG. 6, a stage 1 is mounted in a hollow stage supporting member 2. This stage supporting member 2 has through holes 4 and 5 on its side face and is inserted into an outer frame 10. This outer frame 10 has a through hole 8, and supports the stage supporting member 2 vertically movable through four sets of guide members 3. The guide member 3 has a guided portion 3a fixed to the stage supporting member 2 and a guide portion 3b fixed to the outer frame. Between the guided portion 3a and guide portion 3b, a plurality of balls or rollers are arranged in a line in the vertical direction.

In this way, the vertical movement guide apparatus is fixed to a base of a microscope which is not shown. The stage 1 and the stage supporting member 2 can be moved vertically along guide members 3 by operating a one-shaft handle 6. The light beam emitted from a light source 9 is reflected by a reflection mirror 7 fixed to the outer frame 10 by way of the through hole 8 of the outer frame 10 and the through hole 4 of the stage supporting member 2 and is guided into the stage 1.

As described above, this guide apparatus for vertical movement of a stage is capable of securing the light guide to illuminate a specimen, at the same time supporting the stage supporting member, that is the stage 1 eventually, form both sides thereof by means of the four sets of the guide members 3. Therefore, this guide apparatus for vertical movement of a stage has a high rigidity so that the stage 1 will not be inclined when the center of gravity of the stage 1 is shifted, and that the stage supporting member 2, that is the stage 1 eventually, is movably supported in the vertical direction with stability.

Nevertheless, a conventional guide apparatus for vertical movement of a stage of the kind has the drawbacks given below. This conventional guide apparatus for vertical movement of a stage makes it necessary to provide the four sets of the guide members exactly in the same length and enable all the four sets to hold the stage supporting member evenly. As a result, all the four sets of the guide members, the stage supporting member to which these guide member are fixed, and the outer frame are machined equally with high precisions; thus not only making it extremely difficult to machine each part, but also increasing its manufacturing cost significantly. If not machined with a high precision, the four sets of the guide members cannot be in parallel, hindering smooth vertical movement of the stage.

Also, as shown in FIG. 7, the stage supporting member 2, having the through holes 4 and 5 formed on its side face, lowers the rigidity of the stage supporting member itself. Consequently, when the center of gravity of the stage 1 is shifted, the stage supporting member 2 tends to be bent or twisted. Furthermore, since the stage supporting member 2 reacts to restore itself from this bend or torsion, it becomes easily vibratory. Thus, not only the stage 1 is inclined, bent, or vibrated, but also the parallelism of the four sets of the guides is lost to hinder the smooth vertical movement of the stage 1.

SUMMARY OF THE INVENTION

With attention to these problems encounterd by the conventional technique, the present invention is designed, and the object of the invention is to provide a guide apparatus for vertical movement of a stage having a high rigidity to withstand the weight of a large stage, at the same time being capable of performing smooth vertical movements as well as easy machining and assembly adjustment.

A guide apparatus for vertical movement of a stage according to the present invention supports a stage supporting member for supporting the stage vertically movable by means of two groups of guide mechanism. Each of the guide mechanism groups is separately mountable with respect to the stage supporting member as described in detail in an embodiment. Also, each of the guide mechanism groups is fixed to sandwich the stage supporting member from the left and right sides. Also, for one of the guide mechanisms, a highly rigid guide member machined with a high precision is used while for the other guide mechanism, a guide member having a low rigidity as compared with the foregoing highly rigid guide member is used. Also, one of the guide mechanisms is arranged so that its mounting position can be adjusted to match with the other guide mechanism. Also, the mounting position of one of the guide mechanism is made higher than that of the other guide mechanism. The light path of the beam from a light source is provided lower than the mounting position of the foregoing one of the guide mechanisms.

Therefore, this guide apparatus for vertical movement of a stage can be fabricated in such a manner that one of the guide mechanism groups is assembled and the other guide group is assembled in matching with the parallelism of this guide machinism. In other words, these guide mechanisms can be assembled simpler and adjusted easier than when the four sets of guide mechanisms are assembled at a time. Also, this guide apparatus for vertical movement of a stage is capable of providing the light guide of the beam from the light source without forming any through holes or cut off portions in its stage supporting member for supporting the stage. This means that the rigidity of the stage supporting member can be enhanced to prevent the stage from being inclined or bent.

BRIEF DESCRIPTION OF THE DRAWINGS

FIGS. 4A is a top plan view; 4B, front view; and 4C, side sectional view (taken along the line III—III indicated by an arrow), respectively.

DETAILED DESCRIPTION OF THE PREFERRED EMBODIMENTS

Now, with reference to the accompanying drawings the description will be made of an embodiment of a guide apparatus for vertical movement of a stage. In this respect, FIG. 1 to FIG. 4C are views illustrating the embodiment respectively.

Figure 1:
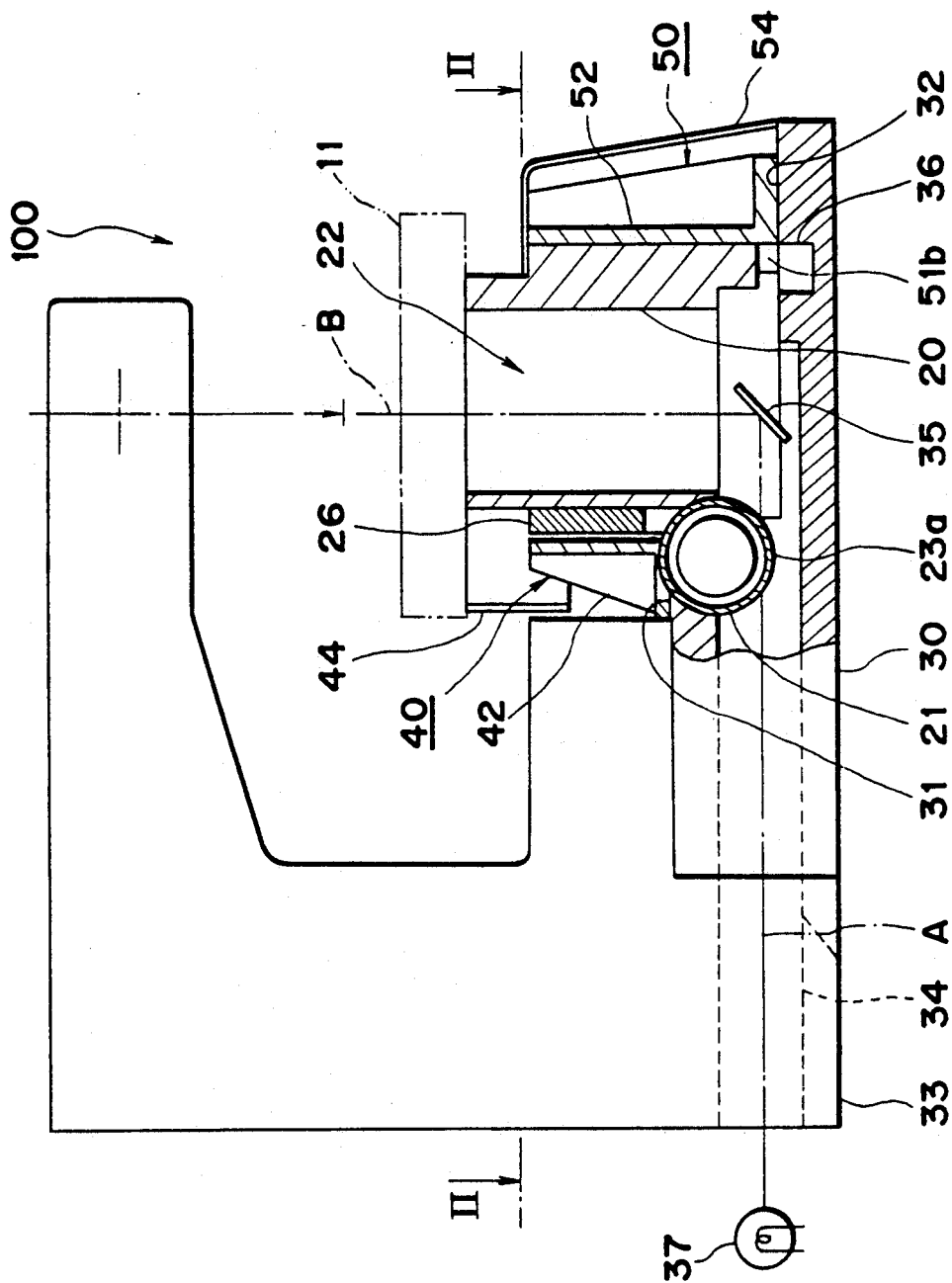
FIG. 1 is a partially sectional front view showing an embodiment of a guide apparatus for vertical movement of a stage according to the present invention.

As shown in FIG. 1, a vertical movement guide apparatus 100 is an apparatus for moving a stage 11 vertically in a microscope having a horizontal light guide 34 through which light beam from a light source 37 passes and a vertical light guide 22 connected to this horizontal light guide 34.

This vertical movement guide apparatus 100 has a stage supporting member 20, a base 30, a sub-guide mechanism 40, and a main guide mechanism 50.

Figure 2:
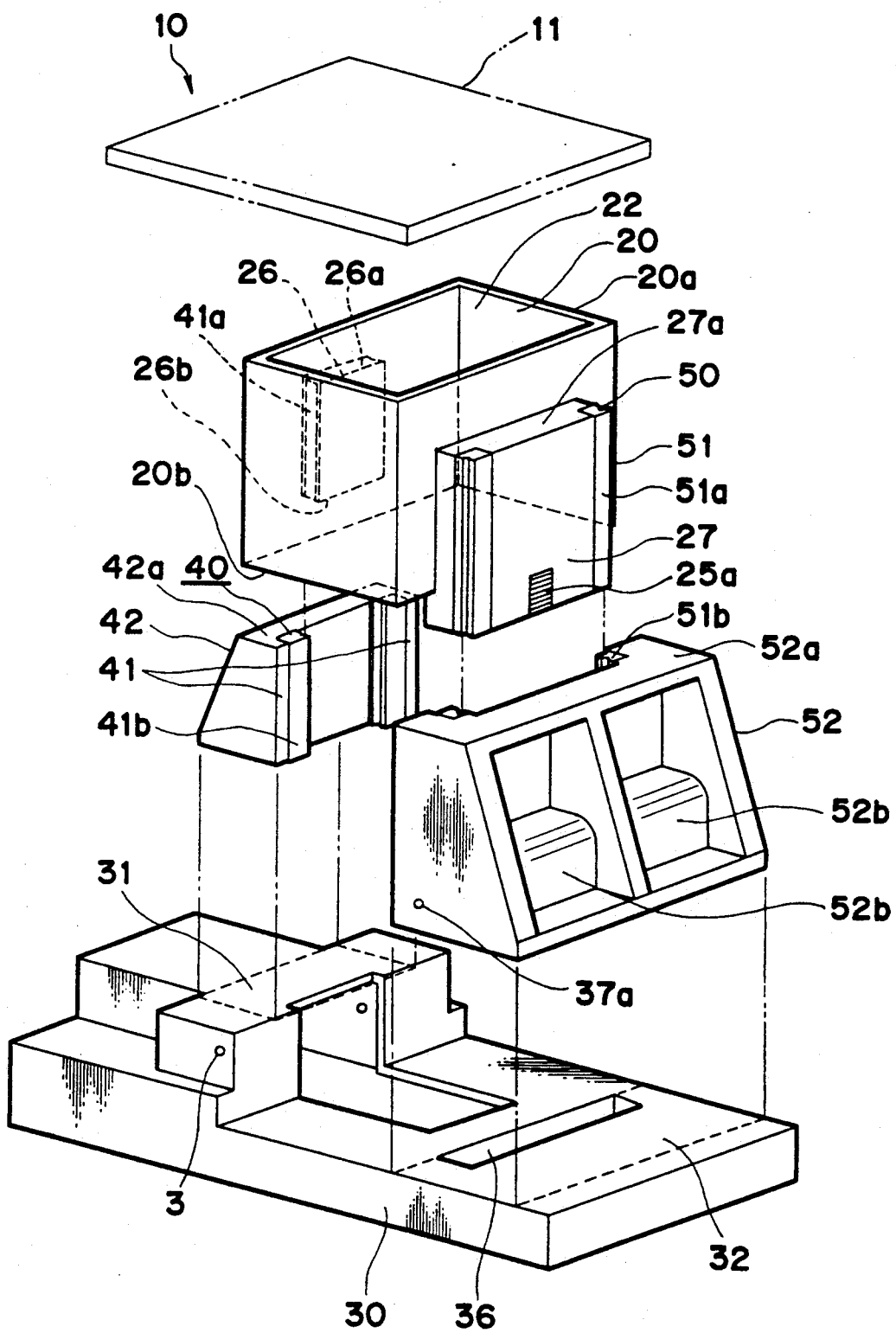
FIG. 2 is an exploded perspective view illustrating an embodiment of a guide apparatus for vertical movement of a stage according to the present invention.

The stage supporting member 20 has a vertical light guide 22 formed by its hollow portion. The vertical light guide 22 allows light beams to pass along its optical axis B which substantially vertical. This stage supporting member 20 supports the stage 11 at its upper end 20a and is vertically movable together with this stage by means of a driving mechanism 21. As shown in FIG. 2, this stage supporting member 20 is formed to be of a hollow square cylindrical type.

The base 30 has, shown in FIG. 1, a horizontal light guide 34, a mirror 35, a sub-guide mounting surface 31, and a main guide mounting surface 32. The horizontal light guide 34 (indicated by dotted lines) allows the light beam introduced from a light source 37 to be passed along the horizontal optical axis A through an arm 33. The mirror 35 is fixed at a position in the lower portion of the stage supporting member 20 where the horizontal light guide 34 and the vertical light guide 22 intersect with each other. The sub-guide mounting surface 31 is provided on the upper face of the base 30 above the horizontal light guide 34, and the main guide mounting surface 32 is provided on the upper face of the base 30 at a position opposite to the sub-guide mounting surface 31 with the vertical light guide 22 therebetween and lower than the sub-guide mounting surface 31.

As shown in FIG. 1, the arm 33 is fixed to the base 30. By this arm 33, an observatory optical system and others including an objective lens, which are not shown, are supported.

Figure 4A:
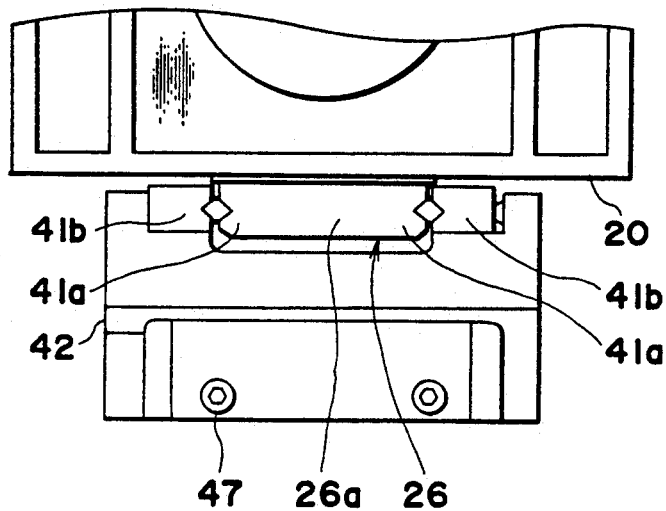
FIGS. 4A to 4C are plan views showing a sub-guide mechanism according to an embodiment of the present invention.
Figure 4B:
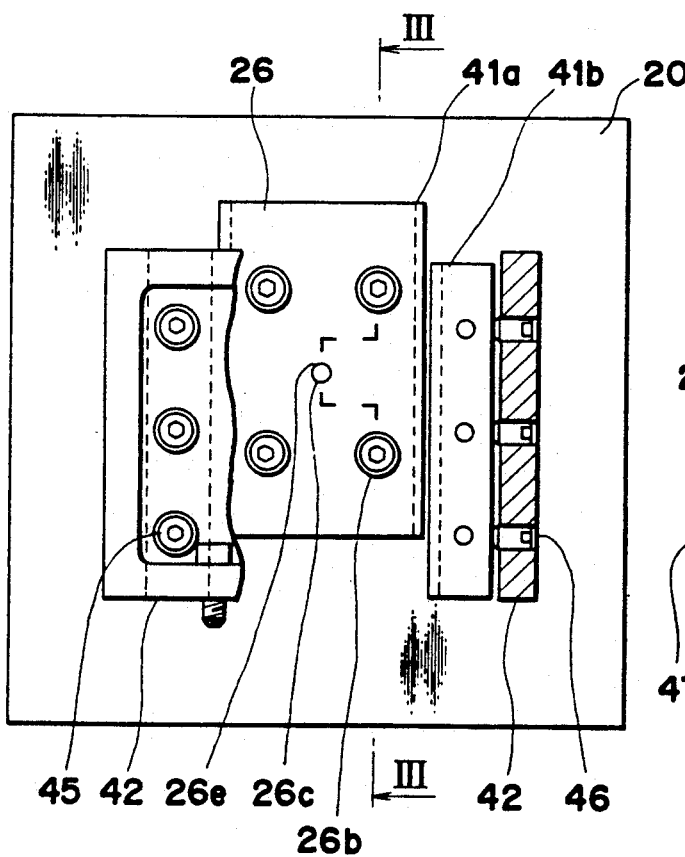
Figure 4C:
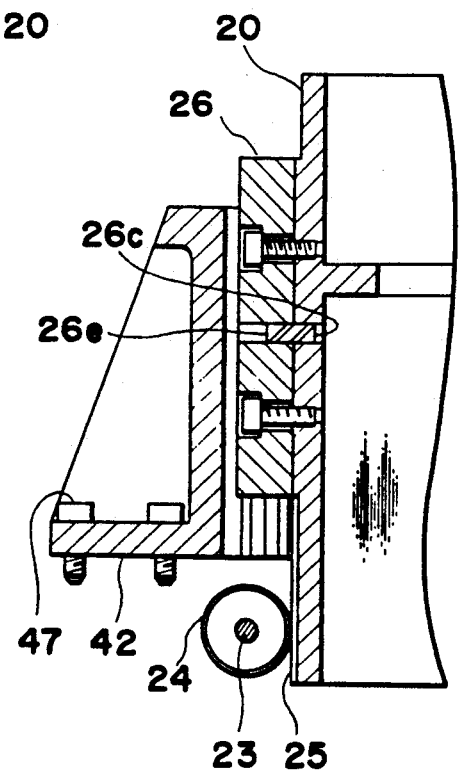
Figure 5:
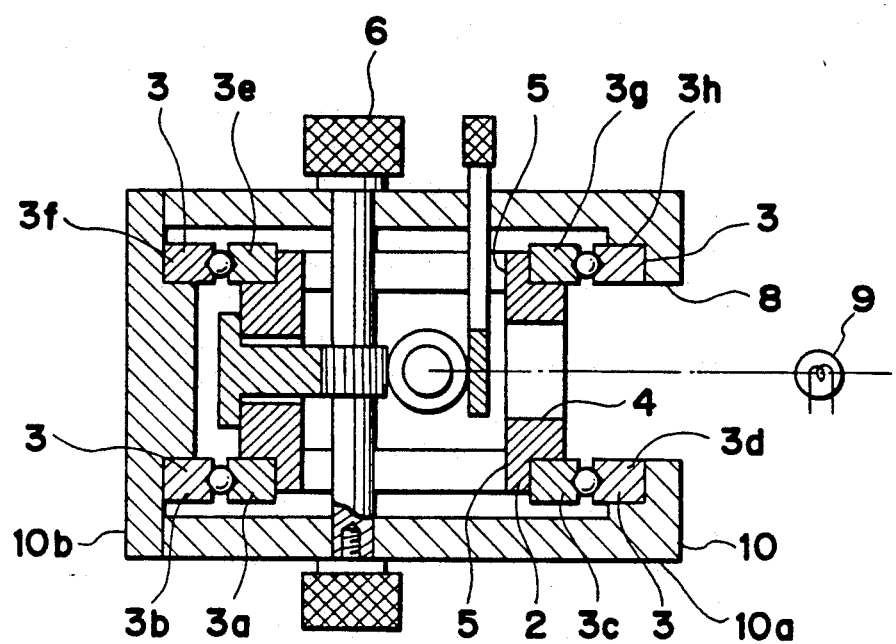
FIG. 5 is a cross-sectional view showing an conventional example of a guide apparatus for vertical movement of a stage.
Figure 6:
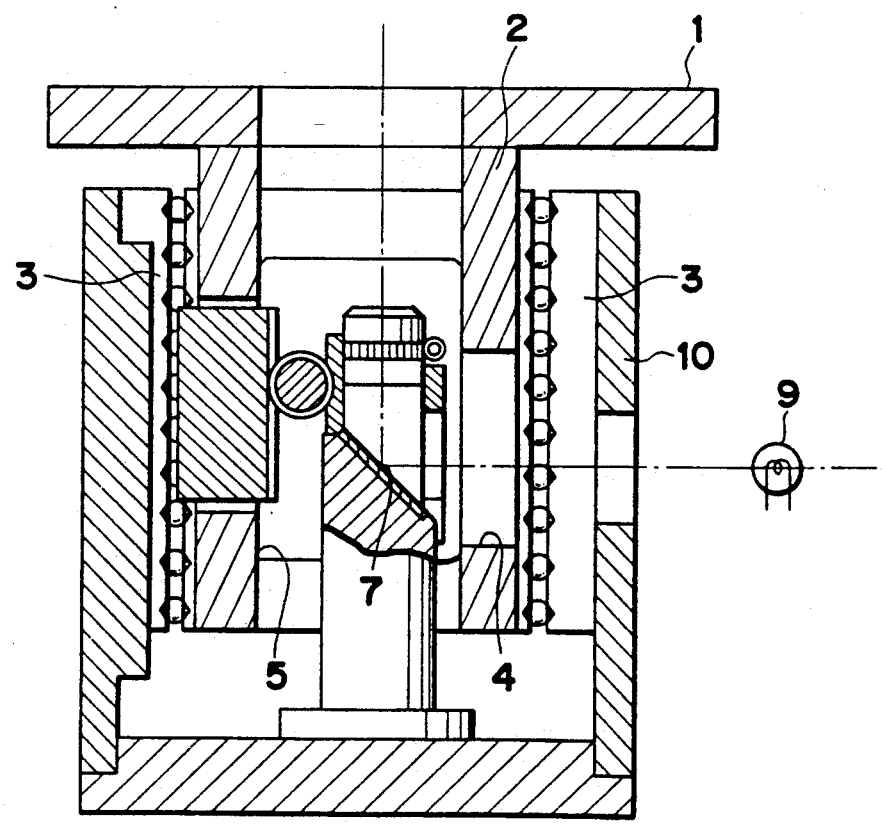
FIG. 6 is a vertically cross-sectional view showing an conventional example of a guide apparatus for vertical movement of a stage.
Figure 7:
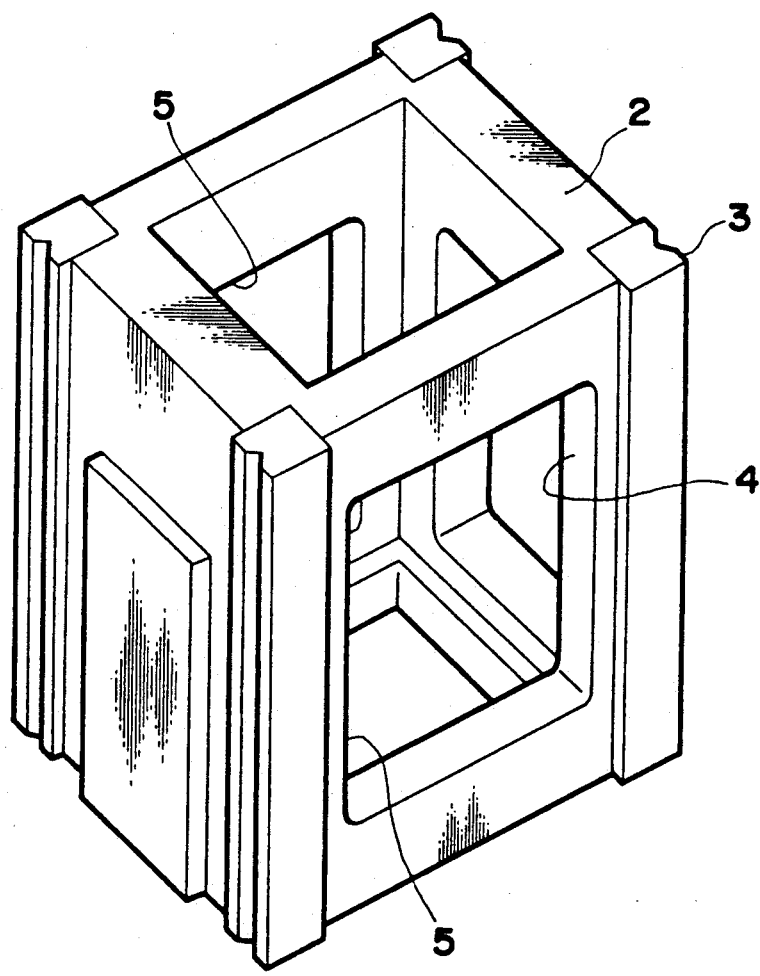
FIG. 7 is a perspective view illustrating a conventional example of a guide apparatus for vertical movement of a stage.

The driving mechanism 21 comprises a driving shaft 23, a pair of handles 23a provided at the ends of the shaft 23, a pinion 24 and a rack 25. As shown in FIG. 2, the driving shaft 23 is inserted into a through hole 37 on the base 30. This through hole 37 is formed between the horizontal light guide 34 and sub-guide mounting surface 31 to penetrate the base 30 in the left and right direction. Also, as shown in FIG. 4C, the pinion 24 is mounted substantially in the center of the driving shaft 23. With this pinion 24, the rack 25 engages. The rack 25 is mounted in the lower portion of the stage supporting member 20. Also, at both ends of the driving shaft 23, the handles 23a are mounted respectively.

The sub-guide mechanism 40 has a sub-guided mounting portion 26, a pair of sub-guided members 41a, and a pair of sub-guide members 41b, and a sub-guide supporting member 42. This sub-guided mounting portion 26 is formed in a length so as not to allow its upper and 26a and lower end 26b to reach the upper end 20a and lower end 20b of the stage supporting member 20. This sub-guided mounting portion 26 is fixed to the position which limits the upper movement of the stage 11 and which does not allow this portion to be projected above the sub-guide supporting member 42. Also, this sub-guided mounting portion 26 is fixed on the rear side of the stage supporting member 20 in such a manner that its mounting position can be adjusted.

A pair of the sub-guided members 41a are integrally formed with the sub-guided mounting portion 26 at both ends thereof with its guide planes facing outward in the left and right directions. With the guide planes, a plurality of rollers, which will be described later, are in contact. Therefore, this pair of sub-guided members 41a are fixed to the stage supporting member 20 when the sub-guided mounting portion 26 is fixed.

The pair of the sub-guide members 41b are arranged on the upper face of the base 30 in such a manner that its guide planes face toward the inner sides on the left and right sides and are positioned outside the pair of the sub-guided members 41a, and between each of the guide planes of the pair of the sub-guide members 41b and those of the pair of the sub-guided members 41a, cross rollers are arranged.

The cross rollers are composed of a plurality of small column rollers. These rollers are arranged vertically along the guide plane of the sub-guided member 41a or sub-guide member 41b in such a way that the adjacent rollers are crossed. Therefore, the sub-guided member 41a and sub-guide member 41b can be moved vertically and relatively each other by means of these rollers which rotate along the guide plane. Also, since the rollers are arranged to cross each other, they are not allowed to move relatively in the two-dimensional directions (horizontal directions). With these rollers, the pair of sub-guide members 41b guide the stage supporting member 20 in the vertical direction through the sub-guided member 41a and sub-guided mounting portion 26.

Also, both ends of the sub-guide supporting member 42 are projectingly formed substantially in the form of U-letter shape in order to fix the guide member 41b. This supporting member 42 is also formed in a shape which expands from the upper portion to the lower portion thereof. In the inner side of the foregoing U-letter portion of this sub-guide supporting member 42, a pair of the sub-guide members 41b are fixed to sandwich the sub-guided members 41a and sub-guided mounting portion 26 between both ends of the pair from right and left This sub-guide supporting member 42 is fixed to the sub-guide mounting face 31. Further, this sub-guide mechanism 40 is enclosed with a cover 44 which is mounted at the lower portion of the stage 11 or almost at the upper end portion of the stage supporting member 42.

Figure 3:
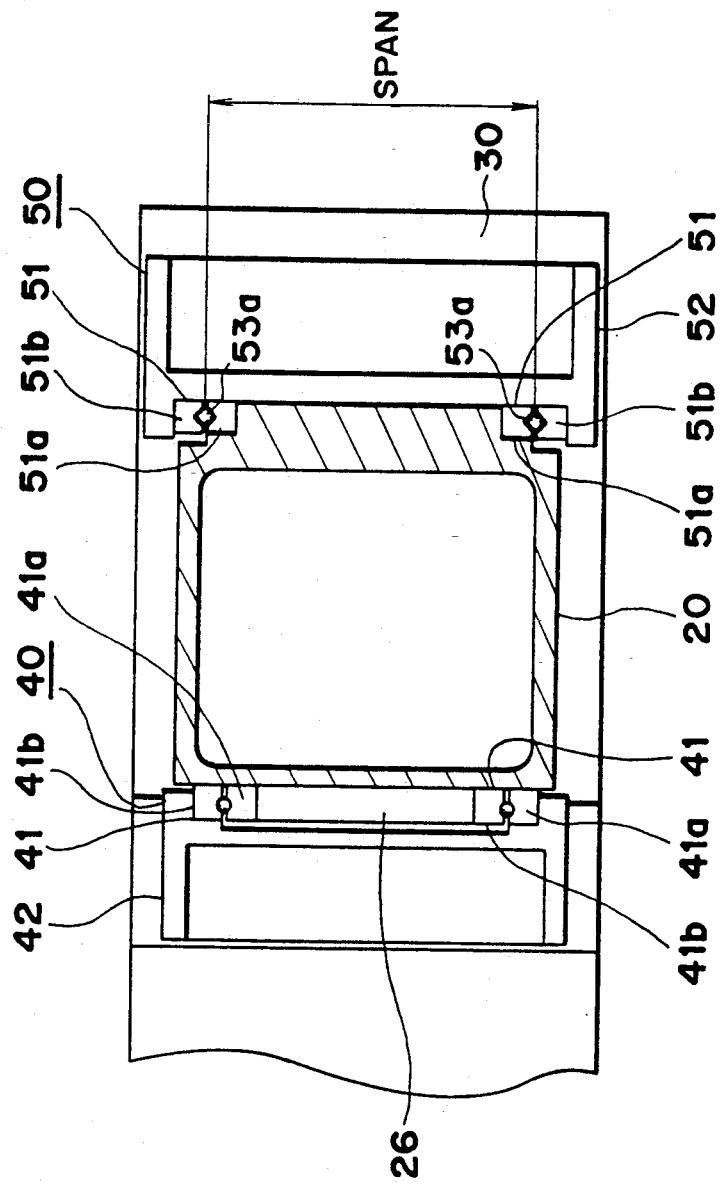
FIG. 3 is a top plan view showing an embodiment of a guide apparatus for vertical movement of a stage according to the present invention.

In this respect, the sub-guided members 41a may be formed separately form the sub-guided mounting portion 26 as shown in FIG. 3, and arranged at both ends of the mounting portion 26 to be fixed to this mounting portion 26 or to the stage supporting member 20.

The main guide mechanism 50 has a main guided mounting portion 27, main guided members 51a, main guide members 51b, and a main guide supporting member 52. The main guide mounting portion 27 is integrally formed with the stage supporting member 20 in such a manner that it is projected on the front side of the stage supporting member 20. This portion 27 is formed to provide its upper end 27a substantially at the same height as the upper end 26a of the sub-guided member 26. Also, it is formed in a shape so that its lower end 27b is extended lower than the lower end 20b of the stage supporting member 20.

In this respect, although the main guided mounting portion 27 is formed in a shape extending downward in order to elongate the guide planes of the main guide members 51a, it may be possible to form it by displacing the position of the main guided mounting portion 27 upward so that it is not projected downward.

The pair of the main guided members 51a are mounted on both end of the main guided mounting portion 27 in such a manner that each of the guide planes faces outwardly. Along each of the guide planes, rollers 53a are arranged. Through the rollers 53a, the pair of the main guide members 51b are arranged. The rollers 53a are so arranged to form rows in vertical direction, in each row the neighboring rollers are crossed to each other. Each of the main guide members 51b makes a pair with each of the main guided members 51a and guides the main guided members 51a, that is, the stage supporting member 20 eventually, in the vertical direction.

The main guide supporting member 52 is shaped substantially in a U-letter form with its right and left ends being projected and in a form which expands from the upper portion to the lower portion. It is fixed to the main guide mounting surface 32. On the inner sides of the U-letter portion of the main guide supporting member 52, the main guide members 51b are fixed with its guide planes facing inwardly to sandwich the main guided member 51a and the main guided mounting portion 27 from the outside in the right and left direction through the cross rollers. Also, on the main guide supporting member 52, the main guide members 51b are fixed in such a manner that the upper ends of the main guide members 51b are matched with the upper end 52a of the main guide supporting member 52 so as not to allow the main guide members 51b to be projected upwardly.

Also, the main guide mechanism 50 is enclosed by a cover 54 to prevent the upper ends of the main guided members 51a, the upper ends of the main guide members 51b, and the upper end 52a of the main guide supporting member 52 from being exposed. Also, on the base 30, a concavity 36 is provided for the main guided mounting portion 27 and main guided member 51a in order to make the lower end 20b of the stage supporting member 20 capable of bringing down the stage 11 lower enough.

The assembly and adjustment of this guide apparatus for vertical movement of a stage are operated as given below. At first, the stage supporting member 20 and the main guide mechanism 50 are assembled and adjusted. The main guide mechanism 50 is fixed on the base 30. Then, the stage supporting member 20 and the sub-guide mechanism 40 are assembled and adjusted. Then, the sub-guide mechanism 40 is fixed on the base 30. The details will be described below.

The pair of the main guided members 51a are fixed to the both ends of the main guided mounting portion 27 of the stage supporting member 20. The main guide members 51b are mounted on the both ends of the main guide supporting member 52 by means of screws lightly to the extent that they will not fall off. Each of the main guided members 51a and the main guide member 51b are connected through rollers so as to be relatively movable. Further, the positions of the main guide members 51b are adjusted to make the stage supporting member 20 smoothly movable in the vertical direction. For this adjustment, the setting vises which are the same as the setting vis 46 shown ,in FIG. 4B are provided for the main guide supporting member 52. By means of the vises, one of the pair of the main guide members 51a is tightened or loosened for adjustment. After this adjustment, the main guide members 51b are fixed tightly by means of the screws. With this adjustment, the main guided members 51a and main guide members 51b are made relatively movable in the vertical direction without any relative movements forward and backward and in the right and left directions.

Then, the guide planes of the main guided members 51a and those of the sub-guided members 41a are adjusted to be in parallel with each other. Since the sub-guided members 41a are formed integrally at both ends of the sub-guided mounting portion 26, this adjustment is made by fixing the sub-guide mounting portion 26 to the stage supporting member 20 so that the guide planes of the main guided members 51a can be paralleled with those of the sub-guided members 41a. Hereinafter, in conjunction with FIGS. 4A to 4C, the details will be described. In this respect, if the guide planes of the main guide members 51b and those of the sub-guide members 41b are not exactly in parallel, this guide apparatus for vertical movement of a stage cannot guide the stage supporting member 20 smoothly in the vertical direction.

As shown in FIGS. 4B and 4C, on the back side of the stage supporting member 20, a mounting surface 20c for the sub-guided mounting portion 26 to be fixed thereon, and a pin 26c which is projected from the back side are provided. On the sub-guided mounting portion 26, a hole 26e is formed to receive this pin 26c. The adjustment to make the main guide mechanism 50 and the sub-guide mechanism 40 to be paralleled is made separately for the right and left directions and forward and backward directions.

The adjustment in the right and left directions is made in such a manner that the sub-guided mounting portion 26 is fitted with this pin and the sub-guided mounting portion 26 is minutely rotated with this pin 26c as its center. In this way, the guide planes of the sub-guided members 41a integrally formed with the sub-guided mounting portion 26 are paralleled with those of the main guided member 51a in the right and left directions.

Also, the adjustment in the forward and backward directions is made by inserting a thin plate between the fixing surface 20c of the stage supporting member 20 and the sub-guided mounting portion 26 above or below the pin 26c. With this adjustment, the sub-guided mounting portion 26 can be inclined. By utilizing this inclination, the guide plane of the sub-guided members formed on the sub-guided mounting portion 26 and those of the main guided members are paralleled.

Subsequent to this adjustment for the parallelism, the sub-guided mounting portion 26 is tightly fixed to the stage supporting member 20 by means of the screws 26d at the four corners. Then, the sub-guide members 51b are fixed to the both ends of the sub-guide supporting member 42 by means of three screws 45, respectively, to the extent that they will not fall off. As described also in relation to the main guide mechanism 50, the inclinations of the sub-guide members 41b are adjusted using setting vises 46. Subsequent to this adjustment, the sub-guide members 41b are tightly fixed. With this adjustment, the sub-guided members 41a and the sub-guide member 41b are made vertically movable without any relative shifts in front, rear, right and left.

Thus, the adjustment between the stage supporting member 20 and main guide mechanism 50 and the one between the stage supporting member 20 and sub-guide mechanism 40 are conducted.

A guide apparatus for vertical movement of a stage of the kind is capable of moving vertically the stage 11 mounted on the stage supporting member 20 with the stage supporting member 20 being moved vertically through the function of the pinion 24 and rack 25 when the handle 23a of the driving mechanism 21 is operated as shown in FIG. 1. At this juncture, the stage supporting member 20 is held both by the sub-guide mechanism 40 and the main guide mechanism 50 is vertically guided; hence making it difficult for the stage 11 and the stage supporting member to be inclined, twisted, or vibrated.

In this guide apparatus for vertical movement of a stage, the sub-guide mechanism 40 is mounted on the sub-guide mounting surface 31 of the base 30 to be positioned above the horizontal light guide 34 while the main guide mechanism 50 is mounted on the main guide mounting surface 32 to be positioned opposite to the horizontal light guide 34 with the vertical light guide 22 between them. As a result, when the stage 11 is moved vertically, the stage supporting member 20, sub-guide mechanism 40, and main guide mechanism 50 do not interrupt the horizontal light guide even if any holes or cut-offs are not provided for the stage supporting member 20 for receiving illumination. Therefore, the light beam emitted by the light source 37 illuminates a specimen on the stage 11 passing through the horizontal light guide 34 and the vertical light guide 22 connected to this horizontal light guide 34.

In this way, the stage supporting member 20 is supported both by the sub-guide mechanism 40 and main guide 50, yet it is made possible to allow the light beam from the light source 17 to pass through below the sub-guide mechanism 40 without any holes or cut-offs on the sides of the stage supporting member 20. Hence, the stage supporting member 20 is provided with an excellent and sufficient rigidity both in the horizontal and vertical directions to withstand the weight of the stage 11 of a large size as well as to prevent any image blur due to vibration.

In this respect, if the stage supporting member 20 is lowered to reach the base 30, the stage supporting member 20 will interrupt the horizontal light guide 34 practically. In this case, however, illuminating conditions are no longer satisfied due to the generation of the illumination unevenness and the like and the rays of light cannot be used as a light beam to illuminate any specimen. Thus, there is no problem eventually even if such as interruption takes place in the horizontal light guide 34. It is only in such a case as replacing specimens or the like that the stage 11 should be lowered like this.

The main guide mounting surface 32 of the base 30 is provided at a position lower than the sub-guide mounting surface 31 and is positioned opposite to the horizontal light guide 34 with the vertical light guide 22 being placed between them. This position is a dead space apart from the arm and the light source. Therefore, the main guide mechanism 50 can be elongated longer than the sub-guide member 40 in the vertical direction. Also, it is possible to form the stage supporting member in a large size. Accordingly, the main guide mechanism 50 can be formed with a high rigidity. The stage supporting member 20 is mainly guided by this highly rigid main guide mechanism 50. The sub-guide mechanism 40 serves to reinforce the measure to prevent the inclination attributable to the vibration in the horizontal direction and heavy load which cannot be prevented by the main guide mechanism 50 alone.

The rigidity of the structure of a guide mechanism required for such a reinforcement can be less than that of a main guide mechanism 50. Therefore, as shown in FIG. 1, the sub-guide mechanism 40 can be made shorter than the main guide mechanism 50. Moreover, the sub-guide mechanism 40 can be adjusted as described earlier. Consequently, the deformation of parts can hardly take place in the sub-guide mechanism 40. It is not easily affected by running, inclination, torsion, or the like between the sub-guided members 41a and sub-guide members 41b, either.

Also, when the vertical movement guide apparatus 100 is assembled, the main guide mechanism 50 and the sub-guide mechanism 40 can be assembled separately. The assembling and running can be adjusted with ease and further, the adjustment is possible between the main guide mechanism 50 and the sub-guide mechanism 40. Therefore, in spite of using more than three sets of guides, it is possible to guide the stage supporting member 20, that is the stage 11 eventually, smoothly in the vertical direction.

In this respect, although the through hole 37 for the driving shaft of the driving mechanism 21 is formed between the horizontal light guide A in the base 30 and the sub-guide mounting surface 31, the rigidity of the base 30 is not weakened both in the horizontal and vertical directions of the base 30 because the through hole can be small as compared with the case where a through hole should be provided in the stage supporting member 20.

Also, the driving mechanism 21 is provided on the back side of the foregoing stage supporting member 20, this mechanism may be arranged on the front side. In such a case, the driving mechanism 21 is structured as given below, for example. As shown in FIG. 2, a through hole 37a is provided for the main guide supporting member 52. The driving shaft is inserted into this through hole 37a. A pinion is provided for this driving shaft while a rack 25a is arranged in the main guide mounting portion 27. In this case, too, the through hole can be small as compared with a through hole which should be provided for the stage supporting member 20. Hence, there is no possibility that the rigidity of the main guide supporting member 52 is weakened. Moreover, since this main guide supporting member 52 is not directly related to the horizontal light guide 34, it is possible to enhance the rigidity by providing a reinforcement member 52b.

As shown in FIG. 3, the sub-guide supporting member 42 sandwiches the sub-guided member 41a and sub-guide member 41b with the sub-guide mounting portion 26 mounted on the stage supporting member 20 from the outside in the right and left directions. Likewise, the main guide supporting member 52 sandwiches the sub-guided member 51a and sub-guide member 51b of the main guide member 51 with the projecting portion 27 formed on the stage supporting member 20 from the outside in the right and left directions. In this way, it is possible to prevent the stage supporting member from being swayed in the right and left directions.

In this respect, each of the guide members 41a, 41b and 51a, 51b are pressed from the outside by the sub-guide supporting member 42 and the main guide supporting member 52. Therefore, as compared with the case where they are sandwiched by the base 30, the span between the sub-guide members 41 and the span between the main guide members 51 can be provided sufficiently to enable the supporting stability of the stage supporting member 20 to be enhanced.

Further, in this respect, the stage supporting member 20 has been described as a hollow square type, but the present invention is not limited thereto. For example, the member may of a hollow polygonal type such as a circle or an octagon. In such a case, the shapes of each of the guide mounting portions and of the guide supporting members can be formed to match with those of each of the stage supporting members.

Since the sub-guided members 41a and 51a and sub-guide members 41b and 51b are arranged at the positions where they will not be exposed to the outside even when the stage is raised to the uppermost position, dusts can hardly adhere to these sub-guided members 41a and 51a and sub-guide members 41b and 51b; hence making it possible to prevent any unfavorable effects given to the operational environment due to dust adhesion or dust generation. Further, the guide mechanisms 40 and 50 are enclosed by covers 44 and 54. Also, there is provided a cover (not shown) between the sub-guide mechanism 40 and the main mechanism 50, and with this cover, the side faces of the base 30 are also enclosed. These are particularly effective in use under the operational environment where dusts should be avoided such as in a clean room and the like to be used for fabricating semiconductor devices, for example.

In this respect, the sub-guide mechanism 40 is enclosed by the cover 44. Therefore, in order to elongate the stroke of the sub-guided member and sub-guide member, it may be possible to make an arrangement so that the sub-guided members 41a can be projected upward at the upper-most position of the stage movement.

Here, in the present embodiment, cross rollers are employed for the sub-guide mechanism and main guide mechanism. However, since the sub-guide mechanism and main guide mechanism are mounted respectively on the flat sub-guide mounting surface and main guide mounting surface, it is possible to design the materials, shapes and kinds flexibly in accordance with the required rigidity as the case may be. For example, as for the sub-guide mechanism, a ball guide (ball race), stroke ball bearing, linear bush, and the like may be adopted in addition to a cross roller guide (roller race) and for the main guide mechanism, the ball race may be used.

Also, for example, it may be possible to support the stage supporting member 20 vertically movable only with the main guide without using the sub-guide. In this case, although the light guide is not interrupted, the size of a stage mounted on the stage supporting member will be limited because the rigidity of the guide apparatus for vertical movement of a stage thus structured is lowered.

What is claimed is:

1. A microscope including the following:
   a stage for mounting a specimen;
   a hollow stage supporting member for supporting said stage having a vertical light guide for guiding a substantially vertical light beam to said stage;
   a base having a horizontal light guide, a reflective member, a first mounting surface, and a second mounting surface, said horizontal light guide allowing the light beam from a light source to pass therethrough, said reflective member being arranged in said horizontal light guide in the vicinity of the end portion of the horizontal light guide, said first and second mounting surfaces being arranged on the upper face of said base sandwiching said reflective member, and said first mounting surface being positioned below said second mounting surface;
   a first guide member being mounted on said first mounting surface;
   a second guide member being mounted on said second mounting surface; and
   said first and second guide members sandwiching said stage supporting member so that said reflective member is positioned below the vertical light guide thereof to guide said stage supporting member movably in the vertical direction.

2. A microscope including the following:
   a stage for mounting a specimen;
   a hollow stage supporting member for supporting said stage having a vertical light guide for guiding a substantially vertical light beam to said stage;
   a main guide mechanism for guiding said stage supporting member in the vertical direction;
   a sub-guide mechanism for guiding said stage supporting member in the vertical direction along the guide planes which are shorter than the guide planes of said main guide mechanism; and a base having a horizontal light guide, a reflective member, a main guide mounting surface, and a sub-guide mounting surface, said horizontal light guide allowing the light beam from a light source to pass therethrough, said reflective member causing the light beam from said light source to be said vertical light beam, said sub-guide mounting surface being positioned on the side of said light source from said stage supporting member, on this sub-guide mounting surface said sub-guide mechanism being fixed, said main guide mounting surface being arranged at a position opposite to said light source with said stage supporting member sandwiched therebetween and lower than said sub-guide mounting surface, and on this main guide mounting surface said main guide mechanism being fixed.

3. A microscope according to claim 2, wherein said main guide mechanism includes the following:
two main guide members;
two main guided members which are guided by each of said main guide members;
a main guided mounting portion integrally formed with said stage supporting member, said main guided mounting portion being projected from said stage supporting member to the opposite side of said light source, and on said main guided mounting portion, each of said main guided members being mounted in the vicinity of the right and left peripheries of said stage supporting member; and
a main guide supporting member sandwiching said main guide members from the outside in the right and left directions to mount each of them facing each of said main guided members.

4. A microscope according to claim 3, wherein a plurality of rollers are arranged regularly in a vertical direction between said main guide members and said main guided members opposed to said main guide members.

5. A microscope according to claim 3, wherein said main guided mounting portion is not provided with any through hole between the two main guides.

6. A microscope according to claim 3, wherein a dustproof cover is provided for said main guide supporting member, said cover being formed to cover the upper ends of said main guide members and main guided members.

7. A microscope according to claim 1, wherein said sub-guide mechanism has at least one set of sub-guide member and sub-guided member.

8. A microscope according to claim 2, wherein said sub-guide mechanism includes the following:
two sub-guide members;
two sub-guided members which are guided by each of said sub-guide members;
a sub-guided mounting portion provided on said stage supporting member to make its mounting position adjustable, this sub-guided mounting portion being projected from said stage supporting member to said light source side, and each of said sub-guide members being arranged in the vicinity of the right and left peripheries of said stage supporting member with this sub-guided mounting portion sandwiched therebetween; and
a sub-guide supporting member sandwiching said sub-guide members from the outside in the right and left directions to mount each of them facing each of said sub-guided members.

9. A microscope according to claim 8, wherein said sub-guided mounting portion and said sub-guided members comprise an integrally formed single part.

10. A microscope according to claim 8, wherein said stage supporting member has a pin projecting to said sub-guide mounting portion side, and said sub-guide mounting portion has a hole into which said pin is fitted.

11. A microscope according to claim 8, wherein said stage has a dustproof cover for covering said sub-guide supporting member, said cover being formed to cover the upper ends of said main guide members and main guided members.

12. A microscope according to claim 8, wherein said stage supporting member has a dustproof cover for covering said sub-guide supporting member, said cover being formed to cover the upper ends of said main guide members and main guided members.

13. A microscope including the following:
a stage for mounting a specimen;
a stage supporting member for supporting said stage having a vertical light guide extending in the vertical direction;
a base having a horizontal light guide extending substantially in the horizontal direction to allow the light beam from a light source to pass therethrough, and being formed in an elongated shape in the optical direction of said light guide;
a reflective member arranged in said horizontal light guide, being positioned in the vicinity of the end portion of this horizontal light guide, and guiding the light beam from the light source passing through said light guide to a specimen on said stage through said vertical light guide; and
first and second guide groups for guiding said stage supporting member in the vertical direction, said first guide group being arranged on the upper face of said base in said light source side from said stage supporting member, and having a pair of first guided member fixed to the vicinity of the right and left ends of said stage supporting member, a pair of first guide members being arranged on the outside further right and left sides of the pair of guided members to sandwich said pair of guided members to guide this pair of guided members in the vertical direction, and a first guide supporting member of substantially U-letter shape having a pair of projected portions at the right and left ends thereof to sandwich said pair of guide members to be fixed from the outside in the right and left directions with this pair of projected portions, this first guide supporting member being fixed on the upper face of said base, and said second guide group being arranged on the upper face of said base on the side opposite to said light source with respect to said stage supporting member, and having a pair of second guided member fixed to the vicinity of the right and left ends of said stage supporting member, a pair of second guide members being arranged on the outside further right and left sides of the pair of second guided members to sandwich said pair of guided members to guide this pair of second guided members in the vertical direction, and a second guide supporting member of substantially U-letter shape having a pair of projected portions at the right and left ends thereof to sandwich said pair of second guide members to be fixed from the outside in the right and left directions with this pair of projected portions.

14. A microscope according to claim 13, wherein said stage supporting member has a first mounting portion and a second mounting portion, said first mounting portion projecting to said light source side and mounting said pair of first guided members at both ends thereof, also said second mounting portion projecting to the side opposite to said light source and mounting said pair of first guided members at both ends thereof.

* * * * *